United States Patent
Collier

(10) Patent No.: US 7,845,839 B2
(45) Date of Patent: Dec. 7, 2010

(54) LIGHT EMITTING DISPLAY

(75) Inventor: Ian T. Collier, Fremont, CA (US)

(73) Assignee: Intematix Corporation, Fremont, CA (US)

( * ) Notice: Subject to any disclaimer, the term of this patent is extended or adjusted under 35 U.S.C. 154(b) by 165 days.

(21) Appl. No.: 12/269,320

(22) Filed: Nov. 12, 2008

(65) Prior Publication Data
US 2009/0168398 A1    Jul. 2, 2009

Related U.S. Application Data

(60) Provisional application No. 61/002,905, filed on Nov. 13, 2007.

(51) Int. Cl.
*F21V 7/04* (2006.01)
*G09F 3/04* (2006.01)
*G09F 13/00* (2006.01)

(52) U.S. Cl. .................. 362/606; 362/231; 362/812; 40/450; 40/541; 40/546

(58) Field of Classification Search ........... 362/606, 362/604, 231, 84, 812, 612; 40/446, 447, 40/450, 451, 542, 544

See application file for complete search history.

(56) References Cited

U.S. PATENT DOCUMENTS

| 2004/0150342 A1* | 8/2004 | Watanabe et al. ........... 313/582 |
| 2009/0080215 A1* | 3/2009 | Anandan .................... 362/606 |
| 2009/0213618 A1* | 8/2009 | Lai ........................... 362/606 |

* cited by examiner

*Primary Examiner*—Ali Alavi
(74) *Attorney, Agent, or Firm*—Fliesler Meyer LLP

(57) ABSTRACT

A light emitting display for generating a selectable character (number, letter or alphanumeric character) comprises a plurality of independently operable light emitting display elements (segments). Each display element comprises: a light guiding medium having a light emitting display face; at least one excitation source (LED) associated with the light guiding medium and independently operable to generate excitation light of a first wavelength range and couple the excitation light into the light guiding medium; and a pattern of at least one phosphor material provided on the light emitting surface and configured to define the light emitting element wherein the phosphor material absorbs at least a part of the excitation light and emits light of a second wavelength range. Each display element can comprise a discrete light guiding medium or display elements can be defined within a single light guiding medium by one or more light reflecting planes.

21 Claims, 3 Drawing Sheets

LIGHT EMITTING DISPLAY

CLAIM OF PRIORITY

This application claims the benefit of priority to U.S. Provisional Application No. 61/002,905 filed Nov. 13, 2007, the specification and drawings of which are incorporated herein by reference.

BACKGROUND OF THE INVENTION

1. Field of the Invention

This invention relates to a light emitting display for generating a selectable character such as for example a number, letter or alphanumeric character. More particularly, although not exclusively, the invention concerns a display capable of generating a large format character, that is of the order of 15 cm or more in size.

2. Description of the Related Art

Many information displays, such as for example those used at fuel stations to indicate fuel prices, electronic score boards at sports venues, school notice boards, travel notice boards in stations and airports, digital clocks and the like, require the generation of large format characters such as numbers, letters or alphanumeric characters. Typically, such applications require a character that can be of the order of six inches (15 cm) or more in size.

Examples of such displays include large format liquid crystal displays (LCD), large format light emitting diode (LED) displays, displays in which an array of discrete LEDs is used to generate a selected character and electro-mechanical displays in which an array of mechanical shutters is used to generate a selected character. In many applications the cost of such displays is prohibitively expensive and a need exists for an inexpensive display capable of generating large format characters.

SUMMARY OF THE INVENTION

The present invention arose in an endeavor to provide an inexpensive light emitting display capable of generating selected large format characters such as numbers, letters or alphanumeric characters that at least in part overcomes the limitations of the known displays.

According to the invention there is provided a light emitting display for generating a selectable character comprising a plurality of independently operable light emitting display elements (segments) wherein each element comprises: a light guiding medium having a light emitting display surface; at least one excitation source (e.g. a light emitting diode) associated with the light guiding medium and independently operable to generate excitation light of a first wavelength range and couple said excitation light into the light guiding medium; and a pattern of at least one phosphor material on the light emitting display surface which defines the shape of the light emitting element wherein the phosphor material absorbs at least a part of the excitation light and emits light of a second wavelength range. An advantage of the display of the invention is its compact nature, especially its overall thickness, which can be substantially the same as the thickness of the light guiding medium (i.e. typically of the order 5 to 10 mm).

Preferably the light guiding medium is substantially planar in form and the excitation light is coupled into at least one edge of the light guiding medium. To reduce the loss of excitation light from the surface of the light guiding medium opposite to that of the display surface, the display can further comprise a reflector on at least a part of the surface of the light guiding medium opposite to the light emitting display surface.

To promote the emission of light from the display, the light emitting display surface preferably includes a surface topology such as a roughening of the surface or a regular patterning such as an array of facets or lenses. The surface topology is preferably configured to promote the emission of light in a pattern corresponding to the pattern of phosphor material. In one arrangement the light guiding medium is fabricated to include the surface topology by, for example, precision molding the light guiding medium. Alternatively, the surface topology can be applied to the light guiding medium by mechanically abrading, scribing, milling, grinding or laser scribing the light guiding medium. In yet a further arrangement the surface topology can comprise a light transmissive material that is applied to the surface by for example screen printing, ink jet printing or other deposition techniques that will be apparent to those skilled in the art. Preferably the material has an index of refraction that is intermediate between that of the light guiding medium and the pattern of phosphor material to provide index matching. In practice the material will have an index of refraction that is similar to, or lower than, the light guiding medium. In one arrangement the surface topology can further define a recess for receiving the one or more phosphor materials.

Each display element can comprise a discrete light guiding medium that can, for example, be cut from a sheet of transparent light guiding material or molded in a required shape.

Alternatively, two or more display elements can be defined within a single light guiding medium by one or more light reflecting planes within the light guiding medium. In one arrangement the light reflecting plane(s) comprise at least two slots projecting into the light guiding medium from opposite faces of the light guiding medium. To ensure optical isolation between neighboring display elements the combined depth of the opposing slots is at least the thickness of the light guiding medium such the slots meet or overlap. The slots can be of a similar depth in which case each slot can have a depth that is at least 50% of the thickness of the light guiding medium. To optimize optical isolation the slots preferably overlap as much as possible by being configured to extend into as large a proportion of the thickness of the light guiding medium as possible without unduly compromising the mechanical integrity of the light guiding medium. Typically the slots can have a depth up to about 90% of the thickness of the light guiding medium. It is also envisaged in other arrangements for opposing slots to have different depths, for example the slots can respectively have depths of 60% to 90% and 10% to 40% of the thickness of the light guiding material. To further increase optical isolation each light reflecting plane can be defined by a plurality (typically three or more) of opposing slots, tapering slots or slots that extend into the light guiding medium at angles in a range of about 45° to 90° to the face of the light guiding medium. The slots can be mechanically cut (e.g. milled or sawn), laser cut, or the waveguide can be precision molded to include the slots. The slots can further be filled with an opaque or light reflecting material to enhance reflectivity of the reflecting planes defined by the slots.

In an alternative arrangement the reflecting plane(s) can comprise a plurality of bubbles within the light guiding medium. Such a plurality of bubbles is conveniently defined in the light guiding medium using a laser to rapidly heat and vaporize selected areas of the medium.

The light guiding medium can comprise any transparent (i.e. light transmissive) medium and preferably comprises: an acrylic; a polycarbonate; a polythene or a glass.

To generate a required color, the display element can comprise a mixture of at least two different phosphor materials. The phosphor material(s) can comprise any phosphor material including both organic or inorganic phosphor materials such as for example a silicate-based phosphor; an aluminate-based phosphor; a nitride-based phosphor material; a sulfate-based phosphor material; an oxy-nitride-based phosphor; an oxy-sulfate-based phosphor; a nitride-based phosphor or garnet materials (YAG). Light emitted by the display (emission product) can comprise photo-luminescent generated light of the second wavelength range only or the combined light of the first and second wavelength ranges. To increase light emission in displays in which the excitation light contributes to the final emission product—whether the final emission product is white or another color—the pattern of phosphor can include an array (pattern) of windows which do not include any phosphor material(s). Due to the isotropic nature of phosphor luminescence this implies that the phosphor will emit about fifty percent of its radiation in a direction back into the light guiding medium. Such light will be reflected by the reflecting surface of the light guiding medium back towards the light emitting display surface. Since the windows are transmissive to both the excitation light and the light generated by the phosphor material, the windows increase the emission of light of both the first and second wavelength ranges from the display element. In one arrangement, the surface topology of the light guiding medium is used to additionally define the pattern of windows in the phosphor material.

The display of the invention finds particular application in the generation of simple characters and accordingly the display elements are preferably configured such that the display is capable of generating a numeral, a letter or an alphanumeric character. Preferably, although not exclusively, the character is at least 15 cm in size.

BRIEF DESCRIPTION OF THE DRAWINGS

In order that the present invention is better understood, embodiments of the invention will now be described, by way of example only, with reference to the accompanying drawings in which.

DETAILED DESCRIPTION OF THE INVENTION

Figure 1:
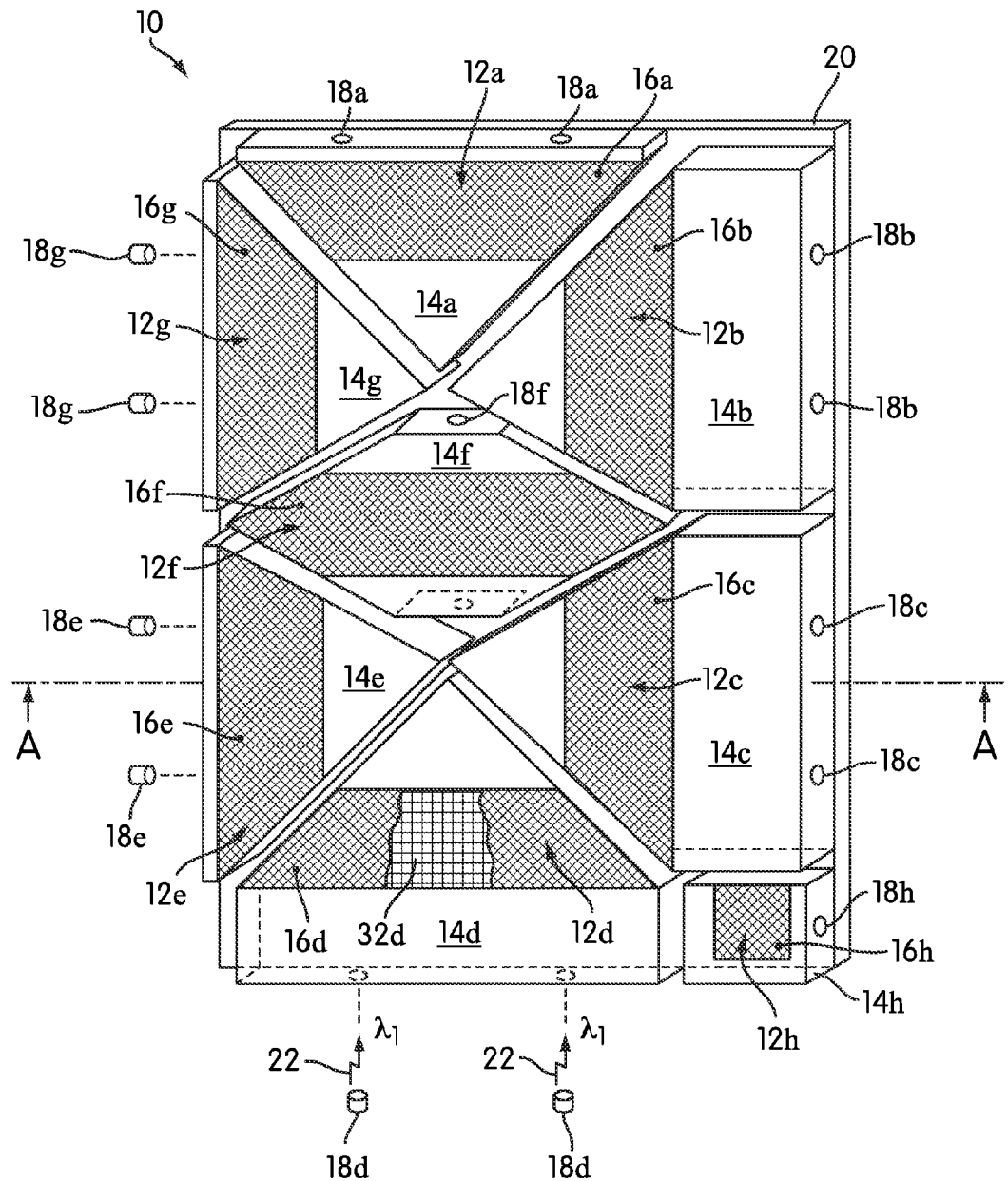
FIG. 1 is a schematic representation of a seven segment type light emitting numeric display in accordance with the invention.

FIG. 1 is a schematic perspective representation of a seven segment type light emitting numeric display 10 in accordance with the invention. The display 10 is intended for use as a part of an information display such as for example those used at fuel stations to indicate fuel prices, electronic score boards at sports venues, school notice boards, travel notice boards in stations or airports, digital clocks and the like. Typically such applications require large format characters in which each character can be of the order of six inches (15 cm) or more in size.

The numeric display 10 comprises eight independently operable light emitting display elements (segments) 12a to 12h in which seven display elements 12a to 12g are used to generate a number and the eighth display element 12h is used to generate a decimal point indicator. In this embodiment each display element 12a to 12h comprises a respective planar light guiding element (light guide) 14a to 14h; a pattern of phosphor material 16a to 16h on a light emitting display surface of the waveguide element 14a to 14h and one or more light emitting diodes (LEDs) 18a to 18h associated with each display element. The display elements 12a to 12h are mounted on a backing plate 20.

Each LED 18 is operable to generate light 22 of wavelength $\lambda_1$ and each preferably comprises an InGaN/GaN (indium gallium nitride/gallium nitride) based LED chip which generates blue light of wavelength $\lambda_1 \approx 400$ to 480 nm. As will be described the light 22 generated by the LEDs 18 provides excitation energy (radiation) for exciting the pattern of phosphor material 16 of the display element 12 and in view of this function the LED generated light 22 will hereinafter be referred to as excitation light.

Each of the planar light guiding elements 14 comprises a light transmissive (substantially transparent) light guiding medium, such as for example an acrylic sheet. In other arrangements the light transmissive medium 14 can comprise other light transmissive materials such as for example a polycarbonate, a polythene or a glass. The phosphor material 16 can comprise any photo-luminescent material which is capable of being excited by the excitation light 22 such as for example, silicate, ortho-silicate, nitride, oxy-nitride, sulfate, oxy-sulfate, garnet or aluminate based phosphor materials.

In one arrangement the phosphor material is a silicate-based phosphor of a general composition $A_3Si(OD)_5$ or $A_2Si(OD)_4$ in which Si is silicon, O is oxygen, A comprises strontium (Sr), barium (Ba), magnesium (Mg) or calcium (Ca) and D comprises chlorine (Cl), fluorine (F), nitrogen (N) or sulfur (S). Examples of silicate-based phosphors are disclosed in our co-pending patent applications US2006/0145123, US2006/0261309, US2007/0029526 and U.S. Pat. No. 7,311, 858 (also assigned to Intematix Corporation) the content of each of which is hereby incorporated by way of reference thereto.

As taught in US2006/0145123, a europium ($Eu^{2+}$) activated silicate-based green phosphor has the general formula $(Sr,A_1)_x(Si,A_2)(O,A_3)_{2+x}:Eu^{2+}$ in which: $A_1$ is at least one of a $2^+$ cation, a combination of $1^+$ and $3^+$ cations such as for example Mg, Ca, Ba, zinc (Zn), sodium (Na), lithium (Li), bismuth (Bi), yttrium (Y) or cerium (Ce); $A_2$ is a $3^+$, $4^+$ or $5^+$ cation such as for example boron (B), aluminum (Al), gallium (Ga), carbon (C), germanium (Ge), N or phosphorus (P); and $A_3$ is a $1^-$, $2^-$ or $3^-$ anion such as for example F, Cl, bromine (Br), N or S. The formula is written to indicate that the $A_1$ cation replaces Sr; the $A_2$ cation replaces Si and the $A_3$ anion replaces oxygen. The value of x is an integer or non-integer between 1.5 and 2.5.

U.S. Pat. No. 7,311,858 discloses a silicate-based yellow-green phosphor having a formula $A_2SiO_4:Eu^{2+}D$, where A is at least one of a divalent metal comprising Sr, Ca, Ba, Mg, Zn or cadmium (Cd); and D is a dopant comprising F, Cl, Br, iodine (I), P, S and N. The dopant D can be present in the phosphor in an amount ranging from about 0.01 to 20 mole percent and at least some of the dopant substitutes for oxygen anions to become incorporated into the crystal lattice of the phosphor. The phosphor can comprise $(Sr_{1-x-y}Ba_xM_y)SiO_4:EU^{2+}D$ in which M comprises Ca, Mg, Zn or Cd and where $0 \leq x \leq 1$ and $0 \leq y \leq 1$.

US2006/0261309 teaches a two phase silicate-based phosphor having a first phase with a crystal structure substantially the same as that of $(M1)_2SiO_4$; and a second phase with a crystal structure substantially the same as that of $(M2)_3SiO_5$ in which M1 and M2 each comprise Sr, Ba, Mg, Ca or Zn. At least one phase is activated with divalent europium ($Eu^2$) and at least one of the phases contains a dopant D comprising F, Cl, Br, S or N. It is believed that at least some of the dopant atoms are located on oxygen atom lattice sites of the host silicate crystal.

US2007/0029526 discloses a silicate-based orange phosphor having the formula $(Sr_{1-x}M_x)_yEu_zSiO_5$ in which M is at least one of a divalent metal comprising Ba, Mg, Ca or Zn; $0<x<0.5$; $2.6<y<3.3$; and $0.001<z<0.5$. The phosphor is configured to emit visible light having a peak emission wavelength greater than about 565 nm.

The phosphor can also comprise an aluminate-based material such as is taught in our co-pending patent application US2006/0158090 and U.S. Pat. No. 7,390,437 (also assigned to Intermatix Corporation) or an aluminum-silicate phosphor as taught in co-pending application US2008/0111472 the content of each of which is hereby incorporated by way of reference thereto.

US2006/0158090 teaches an aluminate-based green phosphor of formula $M_{1-x}Eu_xAl_yO_{[1+3y/2]}$ in which M is at least one of a divalent metal comprising Ba, Sr, Ca, Mg, Mn, Zn, Cu, Cd, Sm or thulium (Tm) and in which $0.1<x<0.9$ and $0.5 \leq y \leq 12$.

U.S. Pat. No. 7,390,437 discloses an aluminate-based blue phosphor having the formula $(M_{1-x}Eu_x)_{2-z}Mg_zAl_yO_{[2+3y/2]}$ in which M is at least one of a divalent metal of Ba or Sr. In one composition the phosphor is configured to absorb radiation in a wavelength ranging from about 280 nm to 420 nm, and to emit visible light having a wavelength ranging from about 420 nm to 560 nm and $0.05<x<0.5$ or $0.2<x<0.5$; $3 \leq y \leq 12$ and $0.8 \leq z \leq 1.2$. The phosphor can be further doped with a halogen dopant H such as Cl, Br or I and be of general composition $(M_{1-x}Eu_x)_{2-z}Mg_zAl_yO_{[2+3y/2]}:H$.

US2008/0111472 teaches an aluminum-silicate orange-red phosphor with mixed divalent and trivalent cations of general formula $(Sr_{1-x-y}M_xT_y)_{3-m}Eu_m(Si_{1-z}Al_z)O_5$ in which M is at least one divalent metal selected from Ba, Mg or Ca in an amount ranging from $0 \leq x \leq 0.4$; T is a trivalent metal selected from Y, lanthanum (La), Ce, praseodymium (Pr), neodymium (Nd), promethium (Pm), samarium (Sm), gadolinium (Gd), terbium (Tb), dysprosium (Dy), holmium (Ho), Erbium (Er), Tm, ytterbium (Yt), lutetium (Lu), thorium (Th), protactinium (Pa) or uranium (U) in an amount ranging from $0 \leq y \leq 0.4$ and z and m are in a range $0 \leq z \leq 0.2$ and $0.001 \leq m \leq 0.5$. The phosphor is configured such that the halogen resides on oxygen lattice sites within the silicate crystal.

The phosphor can also comprise a nitride-based red phosphor material such as is taught in our provisional patent application No. 61/054,399 the content of which is hereby incorporated by way of reference thereto. 61/054,399 teaches a nitride-based red phosphor having the formula $M_mM_aM_bD_{3w}N_{[(2/3)m+z+a+(4/3)b-w]}Z_x$ where $M_m$ is a divalent element selected from beryllium (Be), Mg, Ca, Sr, Ba, Zn, Cd or mercury (Hg); $M_a$ is a trivalent element selected from B, Al, Ga, In, Y, Se, P, As, La, Sm, antimony (Sb) or Bi; $M_b$ is a tetravalent element selected from C, Si, Ge, tin (Sn), Ni, hafnium (Hf), molybdenum (Mo), tungsten (W), Cr, Pb, Ti or zirconium (Zr); D is a halogen selected from F, Cl, Br or I; Z is an activator selected from Eu, Ce, Mn, Tb or Sm, and N is nitrogen in amounts $0.01 \leq m \leq 1.5$, $0.01 \leq a \leq 1.5$, $0.01 \leq b \leq 1.5$, $0.0001 \leq w \leq 0.6$ and $0.0001 \leq z \leq 0.5$. The phosphor is configured to emit visible light with an emission peak wavelength greater than 640 nm.

It will be appreciated that the phosphor is not limited to the examples described herein and can comprise any phosphor material including both organic or inorganic phosphor materials such as for example nitride and/or sulfate phosphor materials, oxy-nitrides and oxy-sulfate phosphors, garnet materials (YAG) or a mixture thereof.

Figure 2:
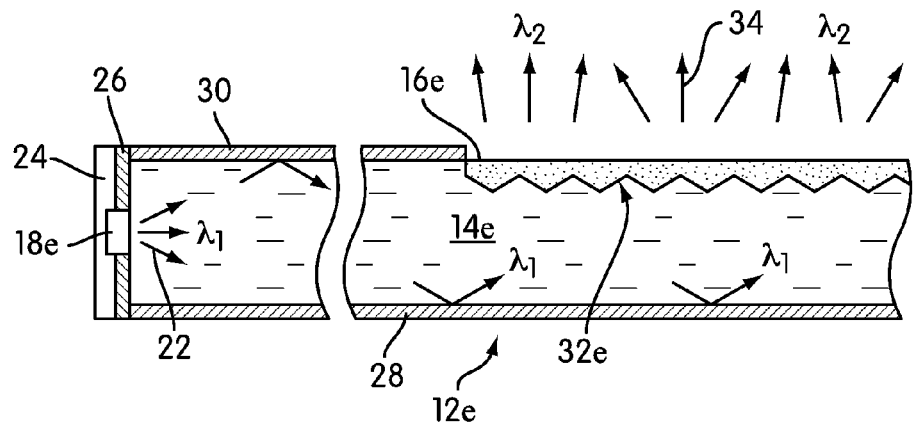
FIG. 2 is a cross sectional representation of a display element (segment) of the display of FIG. 1 through a line "A"

FIG. 2 is a cross sectional representation of a part of the light emitting display element 12e through a line "AA" in FIG. 1. The LED chips 18e are preferably mounted on a heat conducting strip 24, such as for example a MCPCB (metal cored printed circuit board), to provide electrical connection to the LED chips 18e and provide thermal management of the chips by conducting heat to the outer surface of the strip. A strip of LED chips is attached to one or more edges of the light guiding element 14e and is configured to couple excitation light 22 generated by the LED chips 18e into the light guiding element 14e. The inner surface of the strip 24, that is the surface facing the edge of the light guiding element 14e, can include a reflecting surface 26 to reduce the escape of excitation light from the edges of the light guiding element 14e. Alternatively, or in addition, the edges of the light guiding element 14e can include a reflecting surface 26 to minimize the loss of light from the edges. In the display 10 of FIG. 1, two LED chips 18 are provided along one edge of each waveguide element though in practice many more LED chips can be provided along one or more edges of the light guiding element to achieve a desired emission intensity. In other arrangements the LED chip can be mounted in shallow generally hemispherical recesses in the edge(s) of the light guiding element to maximize coupling of light into the light guiding element.

On the light emitting display surface (face) of the light guiding element (i.e. the upper face as illustrated in FIG. 2) the phosphor material 16e is provided as a pattern which defines the shape of the light emitting area of the display element. On the lower face of the light guiding element, that is the face opposite the light emitting display face, there is a layer of reflective material 28e to encourage substantially all light to be emitted from the light emitting display surface of the display element. Additionally, a layer of reflective material 30e or an opaque material can be provided on areas of the light emitting display surface which are not covered with the phosphor material. The reflective material can comprise a metal such as chromium or a white material such as a plastics material or paper.

To ensure a uniform color and or color temperature of emitted light the phosphor material 16e is provided as a substantially uniform layer on the light emitting display surface of light guiding element 14e in a pattern to define the shape of the light emitting display element. The pattern of phosphor material can be deposited on the light guiding element by screen printing a mixture of the phosphor material and a suitable binder, such as NAZDAR's clear screen ink 9700, onto the surface of the element 14. Alternatively, the phosphor material can be mixed with a light transmissive polymer, such as an epoxy or silicone, and the phosphor/polymer mixture deposited in a desired pattern. It will be appreciated that the pattern of phosphor material can be produced by other deposition methods such as spraying, ink jet printing, painting and so forth. To protect the phosphor pattern 16 each light emitting display element or the whole display can further include a transparent protective layer or film (not shown) over the phosphor material.

To promote the emission of light from the face of the light guiding element 14, the light emitting display surface of the light guiding element preferably includes a surface topology 32e, such as a surface roughening, a regular patterning such as an array of facets, lenses or lens structures, which corresponds to the pattern of phosphor material 16. In one arrangement the display surface of the light guiding element 14 is laser scribed with a pattern that is complimentary with the phosphor pattern before the phosphor pattern is deposited. Alternatively, the surface of the light guiding element can include a roughening of the surface or a regular patterning of the surface by mechanical scribing, grinding, milling, abrading or the like. In other arrangements it is envisaged to precision mold the light guiding element to include an array of lenses or other optical features (surface topology) to encourage the emission of light from the light emitting display surface of the element. In yet a further arrangement the surface topology can comprise a light transmissive material that is applied to the surface by for example screen printing, ink jet printing or other deposition techniques that will be apparent to those skilled in the art. Preferably the material has an index of refraction that is intermediate between that of the light guiding element and the pattern of phosphor material to provide a degree of index matching. In practice the material will have an index of refraction that is the same as, similar to, or lower than, the light guiding element. As well as promoting the emission of light from the light emitting surface, the surface topology can also be used to assist in defining the pattern of phosphor material. For example, in the arrangement shown in FIG. 2, the surface topology 32 additionally defines a shallow recess whose shape corresponds to the pattern of phosphor material and which can be used for receiving the phosphor material. Preferably, in such an arrangement the display element is fabricated by precision molding the light guiding element and a pre-selected volume of phosphor/binder mixture is then dispensed into the recess using for example a nano liter size plunger type dispenser head as made by Asymtek. The binder material preferably comprises a transparent UV or thermal cure polymer material such as an epoxy or a silicone such as GE's silicone RTV615. Alternatively, a phosphor/binder mixture can be washed over the entire light emitting surface of the light guiding element and the surface then wiped with a flexible blade or roller (squeegee) to wipe away surplus phosphor material such that phosphor material remains in the recess only.

The light emitting display 10 of FIGS. 1 and 2 is configured to generate a numeral composed of orange light emitting segments 12a to 12h and the phosphor material 16 can comprise, for example, a silicate-based orange phosphor which generates light having a peak emission wavelength $\lambda_2$ greater than about 565 nm. In such an arrangement the phosphor material absorbs substantially all of the blue excitation light and the emission product of the display substantially comprises light generated by the phosphor material. In operation, a selected display element 12 is activated by operating the one or more associated LEDs 18 to generate excitation light 22, of a first wavelength range $\lambda_1$, which is coupled into the light guiding element 14 and which is guided throughout the entire volume of the light guiding element. Light which is emitted through the surface (light emitting display surface), corresponding to the phosphor pattern 16, causes an excitation of the phosphor material which re-emits light 34 of a second, typically longer, wavelength range $\lambda_2$ (e.g. orange in this example).

An advantage of the display of the invention is its compact nature, especially its overall thickness, which can be substantially the same as the thickness of the light guiding element 14 (that is ≈5 to 10 mm).

In the embodiment described above the display comprises light emitting display segments 12a to 12h composed of discrete light guiding (waveguide) elements 14a to 14h. Conveniently, such elements 14 can be precision molded or cut from a sheet of light transmissive (transparent) light guiding material.

Figure 3:
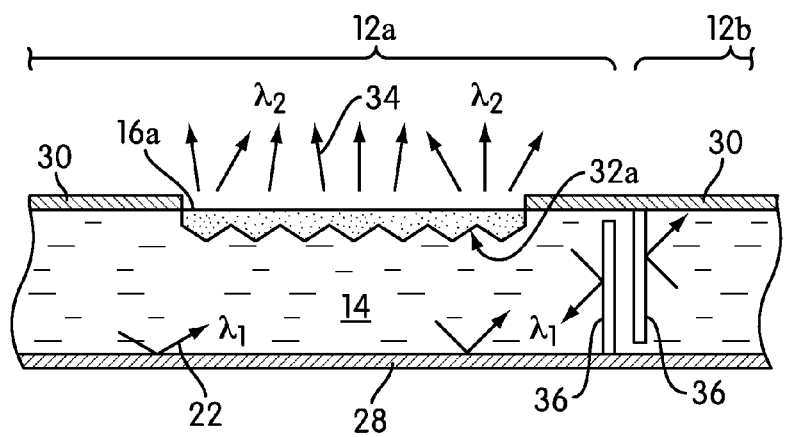
FIG. 3 is a cross sectional representation of a part of two adjacent display elements in accordance with a further embodiment of the invention.
Figure 4:
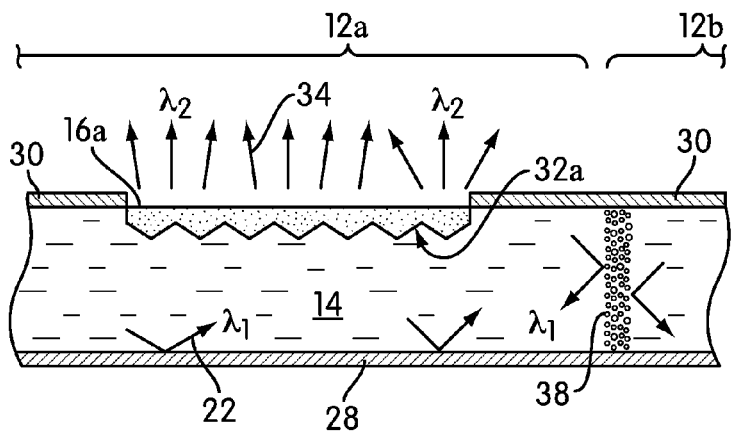
FIG. 4 is a cross sectional representation of a part of two adjacent display elements in accordance with a yet further embodiment of the invention.

It is also envisaged in other implementations to define two or more display elements within a single sheet of waveguide material. FIGS. 3 and 4 are cross sectional representations of two neighboring display elements 12a and 12b that are fabricated in a single light guiding material 14.

In FIG. 3 light reflecting planes are used to separate neighboring (adjacent) display elements within the light guiding medium and are defined by two parallel slots 36 that extend into the light guiding 14 from opposing faces (i.e. the light emitting face and opposite face). As illustrated each slot 36 can extend into the light guiding element (light guide) in a direction that is generally perpendicular to the face of the light guide. To provide optical isolation between neighboring display elements (that is adjacent display elements that share a common light guide) the depth of the slots 36, measured in a direction perpendicular to the face of the light guide, should be such that they have a combined depth that corresponds to at least the thickness of the light guide. In other words the depth of the slots is such that opposing slots at least meet and preferably overlap. For ease of fabrication the slots will often be of the same depth and consequently each slot will have a depth that is at least 50% of the thickness of the light guide. To optimize optical isolation the slots preferably overlap as much as possible by configuring them to extend into as large a proportion of the thickness of the light guide as possible without unduly compromising the mechanical integrity of the light guide. In practice, and as shown in FIG. 3, the slots can have a depth up to about 90% of the thickness of the light guide. It is also envisaged in other arrangements for opposing slots to have different depths, for example the slots can respectively have depths of 60% to 90% and 10% to 40% of the light guide thickness. To further increase optical isolation each light reflecting plane can be defined by a plurality (typically three or more) of opposing slots, by tapering slots or by slots that extend into the light guide at angles in a range of about 45° to 90° to the face of the light guide. The slots can be mechanically cut (e.g. milled or sawn), laser cut, or the waveguide can be precision molded to include the slots. The slots can further be filled with an opaque or light reflecting material to enhance reflectivity of the reflecting planes defined by the slots.

In a further arrangement, as illustrated in FIG. 4, neighboring display elements are separated by reflecting planes which are defined by a series (wall) of bubbles 38 which pass through the thickness of the light guiding material 14. The bubbles 38 are preferably induced in the light guide material using a high power pulsed laser to rapidly heat and vaporize the light guide material leading to the formation of a trail of bubbles of gas within the material corresponding to the passage of the laser pulse through the thickness of the light guide. Accordingly, the display elements can be written from the faces of the light guiding material. Alternatively, two orthogonal laser beams (one passing through the face of the planar light guide and one through an edge of the light guide) can be used to produce an individual bubble at a specified location where the beams cross. In such an arrangement the intensity of each laser beam is selected such that it is below a threshold value at which vaporization of the light guide material occurs but the intensity of the combined beams, where the two beams are coincident, exceeds the threshold.

Figure 5:
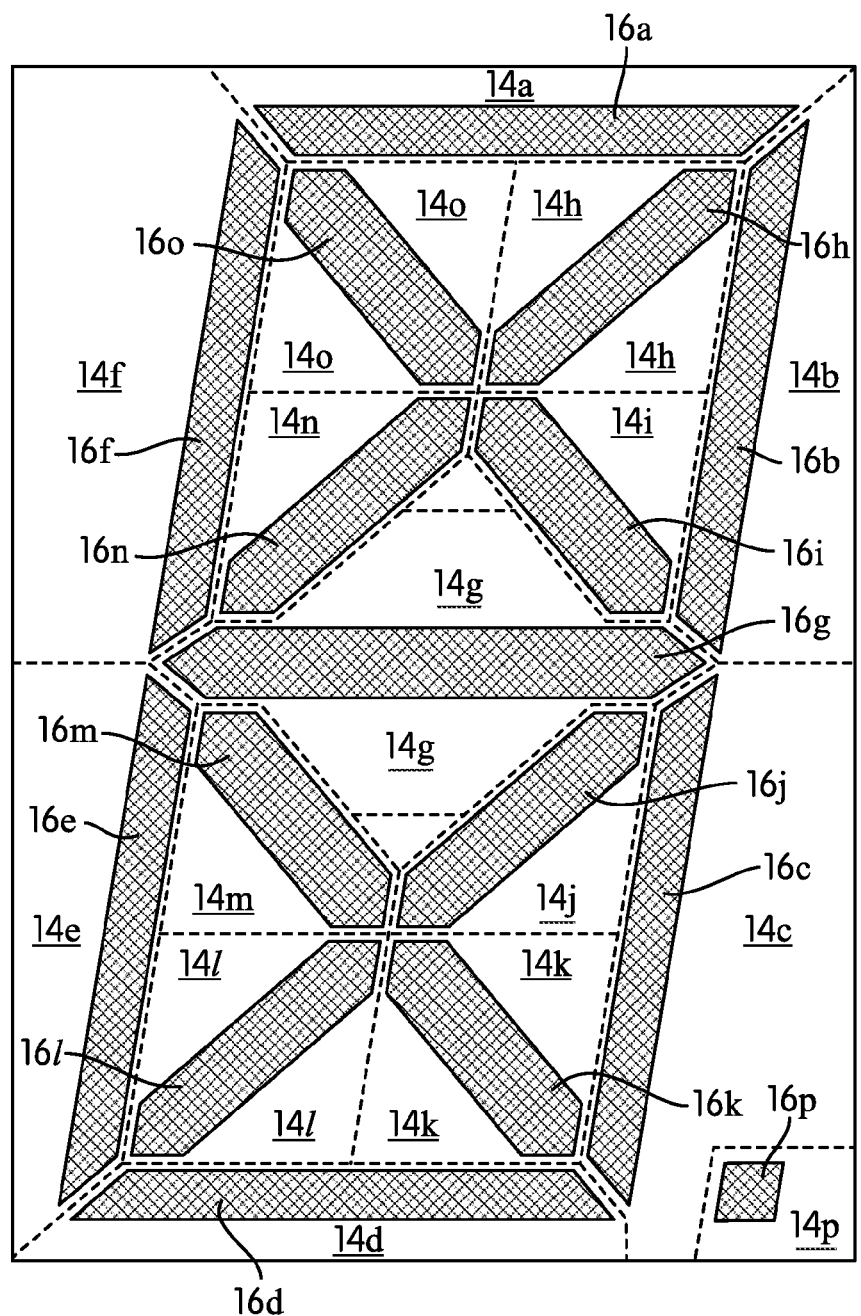
FIG. 5 is a representation of a fifteen segment light emitting alphanumeric display in accordance with the invention.

FIG. 5 shows a schematic representation of a light emitting alphanumeric display in accordance with the invention which comprises sixteen independently operable light emitting display elements (segments) 16a to 16p in which fifteen display elements 16a to 16o are used to generate an alphanumeric character and the sixteenth display element 16p is used to generate a decimal point indicator/period (full stop). In FIG. 5, the shapes of the light guiding elements 14a to 14p are indicated by dashed lines. The display can comprise an assembly of separate individual light guiding elements or one or more planar light guides in which the elements are defined using reflecting planes corresponding to the dashed lines.

It will be appreciated that the present invention is not restricted to the specific embodiments described and that variations can be made that are within the scope of the invention. For example, in other embodiments a UV emitting LED chip can be used to generate excitation light for operating the display elements.

In the exemplary embodiments described, the display is configured such that the pattern of phosphor material absorbs all of the excitation light and consequently the emission product of the display comprises light generated by the phosphor material. In other embodiments the phosphor material thickness and/or density is selected such that it only absorbs a proportion of the excitation light. In such an arrangement the excitation light provides two functions; firstly it provides excitation light for exciting the phosphor material and secondly it comprises a part of the final emission product. Such an arrangement is preferred where it is desired for the display to generate white light or light of a particular color hue. For example, when using a blue emitting LED the phosphor material can comprise a silicate-based green light emitting phosphor material which generates light of wavelength $\lambda_2 \approx 500$ to 540 nm, a garnet or silicate-based yellow light emitting phosphor which generates light of wavelength $\lambda_2 \approx 540$ to 580 nm, a mixture of silicate-based green and orange light emitting phosphors or a mixture of silicate-based green and nitride-based red light emitting phosphors. In operation, the phosphor material absorbs a proportion of the excitation light causing excitation of the phosphor which re-emits for example green light ($\lambda_2$) which combined with the blue excitation light ($\lambda_1$) not absorbed by the phosphor will appear to the eye as being white in color. The proportion of blue excitation light absorbed by the phosphor will depend on the density of phosphor material per unit area and the thickness of the phosphor material.

To increase light emission in displays in which the excitation light contributes to the final emission product—whether the final emission product is white or another color—the phosphor pattern can include an array (pattern) of windows (areas) which do not include any phosphor material. Due to the isotropic nature of phosphor luminescence this implies that the phosphor will emit about fifty percent of its radiation in a direction back into the light guiding medium. Such light will be reflected by the reflecting surface 28 of the light guide back towards the light emitting display surface. Since the windows are transparent to both excitation light ($\lambda_1$) and light ($\lambda_2$) generated by the phosphor material, the windows increase the emission of both blue and green light to be emitted from the display element. Moreover, the surface topology of the light guiding element can be used to additionally define the pattern of windows in the pattern of phosphor material. In one such arrangement the surface topology defines an array of recesses, such as a grid of channels, for receiving the one or more phosphor materials.

To further enhance color uniformity of emitted light the display can further include a light diffusing layer over at least the pattern of phosphor material, which can for example comprise a transparent material including light scattering particles such as silicon dioxide.

Although the display of the invention is intended for, and particularly suited to, the generation of large format characters (typically 15 cm or greater in size), it will be appreciated that the display is not restricted to the generation of characters of a minimum size.

What is claimed is:

1. A light emitting display for generating a selectable character comprising a plurality of independently operable light emitting display elements wherein each element comprises:
    a light guiding medium having a light emitting display surface;
    at least one excitation source associated with the light guiding medium and independently operable to generate excitation light of a first wavelength range and couple said excitation light into the light guiding medium;
    and a pattern of at least one phosphor material on the light emitting display surface which defines the shape of the light emitting element wherein the phosphor material absorbs at least a part of the excitation light and emits light of a second wavelength range.

2. The display according to claim 1, wherein the light guiding medium is substantially planar in form and wherein the excitation light is coupled into at least one edge of the light guiding medium.

3. The display according to claim 2, and further comprising a reflector on at least a part of the surface of the light guiding medium opposite to the light emitting display surface.

4. The display according to claim 1, and further comprising the light emitting display surface of the light guiding medium having a surface topology to promote the emission of light from the light emitting display surface.

5. The display according to claim 4, wherein the surface topology is configured to promote the emission of light in a pattern corresponding to the pattern of the at least one phosphor material.

6. The display according to claim 4, wherein the surface topology is selected from the group consisting of a surface roughening, a regular patterning, an array of facets, an array of lenses.

7. The display according to claim 4, wherein the surface topology further defines a recess for receiving the at least one phosphor material.

8. The display according to claim 2, wherein each display element comprises a discrete light guiding medium.

9. The display according to claim 2, wherein at least two display elements comprise a single light guiding medium that is divided into portions corresponding to respective display elements and wherein the light guiding medium is divided by at least one reflecting plane within the light guiding medium.

10. The display according to claim 9, wherein the at least one reflecting plane comprises at least two slots projecting into the light guiding medium from opposite faces of the medium.

11. The display according to claim 10, wherein the slots have a depth that is in a range 10% to 90% of the thickness of the light guiding medium.

12. The display according to claim 10, wherein each slot has a depth that is at least 50% of the thickness of the light guiding medium.

13. The display according to claim 10, wherein the slots project into the light guiding medium with an angle to the face of the light guiding medium in a range 45° to 90°.

14. The display according to claim 10, and further comprising filling the slots with a substantially opaque or light reflective material.

15. The display according to claim 9, wherein the at least one reflecting plane comprises a plurality of bubbles within the light guiding medium.

16. The display according to claim 1, wherein the light guiding medium is selected from the group consisting of: an acrylic, a polycarbonate, a polythene and a glass.

17. The display according to claim 1, wherein the at least one excitation source comprises a light emitting diode.

18. The display according to claim 1, wherein each display segment comprises a pattern of at least two different phosphor materials.

19. The display according to claim 1, wherein the display elements are configured such as to generate a character selected from the group consisting of: a numeral; a letter; and an alphanumeric character.

20. The display according to claim 19, wherein the character is at least 15 cm in size.

21. The display according to claim 1, wherein light emitted by the element comprises combined light of the first and second wavelength ranges.

* * * * *